United States Patent [19]
Gilbert et al.

[11] 3,894,087
[45] July 8, 1975

[54] METHOD OF PRODUCING 2,2,6-TRICHLOROCYCLO-HEXANONE AND COMPOSITIONS THEREOF

[75] Inventors: Eugene C. Gilbert, Hanover Park; Donald C. McLean, Barrington; Edward Sherman, Chicago, all of Ill.

[73] Assignee: The Quaker Oats Company, Chicago, Ill.

[22] Filed: Feb. 16, 1971

[21] Appl. No.: 115,773

[52] U.S. Cl. ...... 260/586 R; 260/621 R; 260/623 R
[51] Int. Cl. ... C07c 49/30; C07c 37/00; C07c 45/00
[58] Field of Search ................................ 260/586 R

[56] References Cited
UNITED STATES PATENTS
2,674,572   4/1954   Gundet et al. ............. 260/586 R X
3,360,565   12/1967   Arnoldy ..................... 260/586 R

*Primary Examiner*—Bernard Helfin
*Assistant Examiner*—Norman Morgenstern
*Attorney, Agent, or Firm*—Joseph P. O'Halloran

[57] ABSTRACT

Cyclohexanone, 2-chlorocyclohexanone, 2,2-dichlorocyclohexone, or 2,6-dichlorocyclohexanone is chlorinated to form 2,2,6-trichlorocyclohexanone in the presence of an inert saturated hydrocarbon, an inert saturated halogenated hydrocarbon, an inert saturated carboxylic acid, or 2,2,6-trichlorocyclohexanone. 2,2,6-Trichlorocyclohexanone is useful in the preparation of o-chlorophenol.

13 Claims, No Drawings

3,894,087

METHOD OF PRODUCING 2,2,6-TRICHLOROCYCLO-HEXANONE AND COMPOSITIONS THEREOF

BACKGROUND OF THE INVENTION

1. Field of the Invention

This invention relates to a method of producing a trichlorinated alicyclic ketone.

More particularly this invention relates to a method of producing 2,2,6-trichlorocyclohexanone from cyclohexanone, 2-chlorocyclohexanone, 2,2-dichlorocyclohexanone, and 2,6-dichlorocyclohexanone.

2. Description of the Prior Art

Nowhere has 2,2,6-trichlorocyclohexanone been described.

SUMMARY OF THE INVENTION

It is an object of this invention to provide a novel chlorinated cyclohexanone which when pyrolyzed provides isomerically pure o-chlorophenol.

We have found that we can produce a good yield of 2,2,6-trichlorocyclohexanone from cyclohexanone and lower α-chlorinated cyclohexanones in the presence of an interagent.

Our process for the preparation of 2,2,6-trichlorocyclohexanone comprises contacting a mixture of chlorine and a substrate which is cyclohexanone, 2-chlorocyclohexanone, 2,2-dichlorocyclohexanone, or 2,6-dichlorocyclohexanone in the presence of an interagent which is an inert saturated hydrocarbon, an inert saturated halogenated hydrocarbon, an inert saturated carboxylic acid, or 2,2,6-trichlorocyclohexanone. The contacting is at a temperature between 0°C. or the temperature at which the reaction mixture is a liquid, whichever is higher, and 120°C. The ratio of the substrate to the chlorine is between one to more than two moles of chlorine minus one mole for each equivalent of chlorine in the substrate, and one to less than four moles of chlorine minus one mole for each equivalent of chlorine in the substrate.

The reaction is carried out in the presence of the following interagents: inert saturated hydrocarbons, inert saturated chlorinated hydrocarbons, inert saturated carboxylic acids, and 2,2,6-trichlorocyclohexanone. The saturated hydrocarbons, saturated chlorinated hydrocarbons, and saturated carboxylic acids are substantially inert under the conditions of our process. 2,2,6-Trichlorocyclohexanone when used as the interagent is not inert under the conditions of all embodiments of our process as hereinafter more particularly described but is partially converted in some of the least preferred embodiments into 2,2,6,6-tetrachlorocyclohexanone. Under the conditions of the preferred embodiment of our process 2,2,6-trichlorocyclohexanone is substantially inert.

Suitable inert saturated hydrocarbons include for example hydrocarbons containing 5 to 10 carbon atoms such as pentane, hexane, cyclohexane, octane, and decane. Suitable saturated halogenated hydrocarbons include for example aliphatic hydrocarbons containing 1 to 2 carbon atoms and 2 to 4 halogen atoms such as carbon tetrachloride, methylene dichloride, and tetrachloroethanes. Suitable saturated carboxylic acids include for example saturated aliphatic carboxylic acids containing from 2 to 5 carbon atoms such as acetic acid, propionic acid, and butanoic acid.

The reaction is performed in the liquid phase at a temperature between 0°C. or the temperature at which the reaction mixture is a liquid, whichever is higher, and 120°C. The reaction is preferably carried out at a temperature between 20°C. or the temperature at which the reaction mixture is a liquid, whichever is higher, and 90°C. When the boiling temperature of the inert solvent is in the above range, the reaction is conveniently conducted at reflux.

The reaction is preferably carried out in the presence of acetic acid. With acetic acid as solvent at temperatures between 20° and 90°C., yields of about 90 percent of theoretical have been achieved.

In carrying out the reaction the reactants are contacted with one another, conveniently by adding chlorine gas to the substrate in the presence of the interagent. One preferred method of contacting the reactants is by feeding the chlorine into the interagent containing the substrate until the chlorine is in a ratio of at least three moles of chlorine minus one mole for each equivalent of chlorine in the substrate and less than four moles of chlorine minus one mole for each equivalent of chlorine in the substrate to one mole of substrate. Sometimes the yield of 2,2,6-trichlorocyclohexanone can be maximized and the side reaction products minimized by continuously feeding the substrate and the chlorine into the interagent. Throughout the continuous feeding the chlorine is preferably in the ratio to the substrate of at least three moles of chlorine minus one mole for each equivalent of chlorine in the substrate and less than four moles of chlorine minus one mole for each equivalent of chlorine in the substrate to one mole of substrate. Whether or not continuous feeding of the substrate and the chlorine into the interagent enhances the yield of 2,2,6-trichlorocyclohexanone and minimizes the side reaction products under a given set of conditions of our process can be easily determined by one skilled in the art.

The contacting of substrate and chlorine in the presence of an interagent may also be in the presence of a catalyst which is a heteroaromatic amine, alkyl substituted amide, alkyl substituted urea, tertiary alkyl amine, or a salt thereof at a temperature between 0°C. or the temperature at which the reaction mixture is a liquid, whichever is higher, and 60°C.

Suitable heteroaromatic amines include for example collidines, pyridine, quinoline, lutidines, picolines, pyrazine, and coal tar bases. Suitable alkyl substituted amides for example are N,N-dimethylacetamide, N,N-diethylacetamide, N,N-dimethylpropionamide, and N,N-diethylpropionamide. Suitable alkyl substituted ureas include for example tetramethylurea, tetraethylurea, dimethyldiethylurea, monomethyltriethylurea, and trimethylethylurea. Suitable tertiary amines include for example tri-n-butylamine, trimethylamine, and tripropylamine.

The reaction may also be carried out in the presence of acid salts of the above heteroaromatic amines, alkyl substituted amides, alkyl substituted ureas, and tertiary amines. Suitable acids include both inorganic and organic acids such as hydrochloric acid and acetic acid.

When the contacting is in the presence of a catalyst, it is preferred that the catalyst be collidine or the hydrochloric acid salt of collidine at a temperature between 20°C. or the temperature at which the reaction mixture is a liquid, whichever is higher, and 40°C. The chlorine is preferably in a ratio of at least three moles of chlorine minus one mole for each equivalent of chlorine in the substrate and less than four moles of chlorine minus one mole for each equivalent of chlorine in the substrate to one mole of substrate.

When the reaction is carried out in the presence of collidine hydrochloride as catalyst and in the presence of carbon tetrachloride or 2,2,6-trichlorocyclohexanone as interagent, yields up to 87–88 percent of theoretical have been obtained.

Although it is not preferred, the contacting of substrate and chlorine in the presence of an interagent may also be in the presence of a catalyst which is a primary aliphatic amine, secondary aliphatic amine, aromatic amine, N-haloaliphatic amine, N-haloaromatic amine, or salts thereof at a temperature between 50°C. or the temperature at which the reaction mixture is a liquid, whichever is higher, and 120°C. The above mentioned N-haloamines are formed by the action of the chlorine on the unsubstituted hydrogen atoms in the primary and secondary amines.

Suitable primary aliphatic amines for example are ethylene diamine, propylamine, n-butylamine, and t-butylamine. Suitable secondary aliphatic amines include for example diethylamine and dipropylamine. Suitable aromatic amines for example are aniline, toluidines, and phenylene diamines. Suitable N-haloaromatic amines are for example N-chloroaniline and N,N-dichloroaniline. Suitable N-haloaliphatic amines include for example N-chloropropylamine, N,N-dichloropropylamine, and N-chlorodiethylamine. Salts in the presence of which the reaction is performed include compounds of the above catalysts with inorganic and organic acids such as hydrochloric acid and acetic acid.

The contacting of the chlorine and the substrate in the presence of an interagent, while not the preferred method, may be in the presence of a primary aliphatic amine or an N-substituted aromatic amine preferably at a temperature between 70°C. or the temperature at which the reaction mixture is a liquid, whichever is higher, and 90°C. The chlorine is preferably in a ratio of at least three moles of chlorine minus one mole for each equivalent of chlorine in the substrate and less than four moles of chlorine minus one mole for each equivalent of chlorine in the substrate to one mole of substrate.

Suitable N-substituted aromatic amines are for example dimethylaniline and diethylaniline. Sometimes it is preferred to maintain the product-containing reaction mixture in the reaction temperature range for at least 15 minutes following completion of the contacting of the reactants to insure completion of the reaction.

The desired product is separated from the reaction mixture by conventional procedures; most typically, the dissolved chlorine and hydrogen chloride and interagent are stripped off by evaporation when the interagent is not 2,2,6-trichlorocyclohexanone. The product of course contains catalyst when the reaction is in the presence of a catalyst but for many purposes no separation is required. When desired the product can be further purified for example by fractional distillation in a wiped film still under substantially reduced pressure.

The product of the above process on pyrolysis provides o-chlorophenol of high purity. For example, a sample of trichlorocyclohexanone 87 percent by weight pure and containing 2 percent by weight of collidine hydrochloride was pyrolyzed under nitrogen at 150°C. and the product was fractionally distilled. The main fraction was 97 percent by weight of isomerically pure o-chlorophenol from the 2,2,6-trichlorocyclohexanone and 3 percent by weight of a mixture of phenol and 2,6-dichlorophenol arising from 2,6-dichlorocyclohexanone and 2,2,6,6-tetrachlorocyclohexanone, respectively, present as impurities in the material charged to the pyrolysis. The isomerically pure o-chlorophenol can be easily separated from the phenol and 2,6-dichlorophenol impurities by distillation and accounted for 87 percent by weight of the pyrolysis product.

Heretofore isomerically pure o-chlorophenol has not been readily available. o-Chlorophenol has been made commercially by the direct chlorination of phenol with chlorine and by the hydrolysis of o-dichlorobenzene. Both of these processes produce mixtures of o-chlorophenol, m-chlorophenol, and p-chlorophenol and di- and trisubstituted phenols. The pyrolysis of the novel chlorinated cyclohexanone of this invention provides o-chlorophenol of high purity. Hence, 2,2,6-trichlorocyclohexanone and the preparation thereof contributes a substantial benefit to the art by providing a useful intermediate to o-chlorophenol.

o-Chlorophenol is used as a bactericide, for example, C. A. Cooper, Chem. Ind., 805 (1945); and as a fungicide, for example, T. C. Scheffer and C. G. Duncan, Ind. Eng. Chem. Ind. Edit., 33, 619 (1949). A review of uses for o-chlorophenol is given in Chem. Prumysl, 5, 298-9 (1966).

DESCRIPTION OF THE PREFERRED EMBODIMENTS

The following preferred embodiments of the invention are shown for the purpose of illustrating the invention and demonstrating the best mode for practicing the invention. It will be apparent to those skilled in the art that various changes and modifications may be made therein without departing from the spirit and scope of the invention as it is more precisely defined in the subjoined claims.

EXAMPLE 1

It is a purpose of this example to show the best mode of practicing the invention.

Test 1 was made according to the following procedure: At 20°C., 709 grams of chlorine were introduced into a mixture of 800 ml. of glacial acetic acid and 294 grams of cyclohexanone. After complete addition of the chlorine, the reaction mixture was maintained at 20°–30°C. for 2 hours. The mixture was then concentrated on a rotary evaporator to strip off the acetic acid, excess chlorine, and dissolved hydrogen chloride. The product contained 2,2,6-trichlorocyclohexanone and was 89 percent of the theoretical yield.

For the purpose of obtaining a pure product for identification, the product was passed through a column containing an anhydrous polystyrene sulfonic acid ion exchange resin and then was purified by distillation at a reduced pressure of 0.30 mm with minimal heating of the distillation pot to prevent decomposition. The product was then distilled six times. The purified product was 99 percent pure 2,2,6-trichlorocyclohexanone and had a density at 25°C. of 1.4342, a boiling point of 50°C. at 0.015 mm of Hg, and a refractive index, $N_D^{25}$ = 1.5142. The infra-red spectrum of 2,2,6-trichlorocyclohexanone showed carbonyl and chlorine at 1750 cm$^{-1}$ and 730 cm$^{-1}$ respectively. The nuclear magnetic resonance spectrum of 2,2,6-trichlorocyclohexanone consisted of four multiplets at 8.00 τ, 7.45 τ, 7.15 τ, and 4.80 τ.

EXAMPLE 2

Test 2 was made according to the following procedure: At 30°C., 568 grams of chlorine and 196 grams of cyclohexanone were added to 535 ml. of glacial acetic acid. The chlorine and the cyclohexanone were continuously fed into the acetic acid over a period of 5 hours. The chlorine and the cyclohexanone were maintained in the ratio of more than three moles of chlorine to one mole of cyclohexanone throughout the reaction.

After the addition of the chlorine and the cyclohexanone was completed, the reaction mixture was maintained at 30°C. for 2 hours. The mixture was then concentrated on a rotary evaporator to strip off the acetic acid, excess chlorine, and dissolved hydrogen chloride. The product contained 2,2,6-trichlorocyclohexane and was 83 percent of theoretical.

EXAMPLE 3

Following the procedure of Example 1 but without further purification by distillation, Test 3 was made from 217 grams of chlorine and 59 grams of cyclohexanone in 22.5 ml. of acetic acid and 120 ml. of carbon tetrachloride at 65°C. A product was obtained which comprised 57 percent by weight of 2,2,6-trichlorocyclohexanone, 2 percent by weight of 2,2,6,6-tetrachlorocyclohexanone, and 41 percent by weight of 2,6-dichlorocyclohexanone.

EXAMPLE 4

Following the procedure of Example 2, Test 4 was made from 355 grams of chlorine and 196 grams of cyclohexanone in 53.5 ml. of acetic acid and 400 ml. of carbon tetrachloride at 10°C. A product was obtained which comprised 43 percent by weight of 2,2,6-trichlorocyclohexanone, 1 percent by weight of 2,2,6,6-tetrachlorocyclohexanone, and 55 percent by weight of 2,6-dichlorocyclohexanone.

EXAMPLE 5

Using the procedure of Example 2, Test 5 was made from 55 grams of chlorine and 20 grams of cyclohexanone in 23.5 grams of 2,2,6-trichlorocyclohexanone at 25°C. A product was obtained which comprised 72 percent by weight 2,2,6-trichlorocyclohexanone, 25 percent by weight 2,6-dichlorocyclohexanone, and 2 percent by weight 2,2,6,6-tetrachlorocyclohexanone.

EXAMPLE 6

It is a purpose of this example to show that 2-chlorocyclohexanone is a satisfactory substrate.

Following the procedure of Example 2, Test 6 was made from 10 grams of chlorine and 5 grams of 2-chlorocyclohexanone in 20 ml. of acetic acid at 25°C. A product was obtained which comprised 53 percent by weight 2,2,6-trichlorocyclohexanone and 43 percent by weight 2,6-dichlorocyclohexanone.

EXAMPLE 7

Following the procedure of Example 1 but without further purification, Test 7 was made for 639 grams of chlorine and 294 grams of cyclohexanone in 800 ml. of acetic acid containing 16 grams of coal tar bases at 30°C. A product was obtained which comprised 76 percent by weight of 2,2,6-trichlorocyclohexanone and 24 percent by weight 2,6-dichlorocyclohexanone.

EXAMPLE 8

Following the procedure of Example 2, Test 8 was made from 355 grams of chlorine and 98 grams of cyclohexanone in 200 ml. of carbon tetrachloride containing 15 grams of diethylaniline at 70°–85°C. A product was obtained which comprised 70 percent by weight of 2,2,6-trichlorocyclohexanone, 11 percent by weight of 2,2,6,6-tetrachlorocyclohexanone, and 19 percent by weight of 2,6-dichlorocyclohexanone.

EXAMPLE 9

Following the procedure of Example 2, Tests 9 and 10 were made. Test 9 was made from 284 grams of chlorine and 98 grams of cyclohexanone in 75 grams of 2,2,6-trichlorocyclohexanone containing 14.3 grams of collidine hydrochloride at 20°–40°C. A product was obtained for Test 9 which comprised 88 percent by weight of 2,2,6-trichlorocyclohexanone, 7 percent by weight of 2,2,6,6-tetrachlorocyclohexanone, and 5 percent by weight of 2,6-dichlorocyclohexanone.

EXAMPLE 10

Test 10 was made from 284 grams of chlorine and 98 grams of cyclohexanone in 200 ml. of carbon tetrachloride containing 14.3 grams of collidine hydrochloride at 20°–40°C. A product was obtained from Test 10 which comprised 87 percent by weight of 2,2,6-trichlorocyclohexanone, 7 percent by weight of 2,2,6,6-tetrachlorocyclohexanone, and 6 percent by weight of 2,6-dichlorocyclohexanone.

EXAMPLE 11

Test 11 was made from 284 grams of chlorine and 98 grams of cyclohexanone in 200 ml. of cyclohexane containing 8 grams of dimethylacetamide at 20°–40°C. following the procedure of Example 1 but without further purification. A product was obtained from Test 11 which contained 2,2,6-trichlorocyclohexanone in better than 70 percent by weight yield.

From the foregoing description it is considered to be clear that the present invention contributes a substantial benefit to the art by providing a new composition of matter and method for making the same.

We claim:

1. 2,2,6-Trichlorocyclohexanone.
2. A process for the preparation of 2,2,6-trichlorocyclohexanone which comprises:
   a. contacting in a non-aqueous system a mixture of chlorine and a substrate selected from the group consisting of cyclohexanone, 2-chlorocyclohexanone, 2,2-dichlorocyclohexanone, and 2,6-dichlorocyclohexanone at a temperature between 0°C. or the temperature at which the reaction mixture is a liquid, whichever is higher, and 120°C. in the presence of an interagent selected from the group consisting of inert saturated hydrocarbons, inert saturated halogenated hydrocarbons, inert saturated carboxylic acids, and 2,2,6-trichlorocyclohexanone; said substrate being in a ratio to said chlorine between one to more than two moles of said chlorine minus one mole for each equivalent of chlorine in said substrate, and one to less than four moles of said chlorine minus one mole for each equivalent of chlorine in said substrate; and b. separating said 2,2,6-trichlorocyclohexanone from the reaction mixture.

3. The process as in claim 2 wherein the temperature is between 20°C. or the temperature at which the reaction mixture is a liquid, whichever is higher, and 90°C.

4. The process as in claim 3 wherein said saturated carboxylic acid is acetic acid.

5. The process as in claim 2 wherein said contacting comprises continuously feeding said substrate and said chlorine into said interagent, said chlorine being in a ratio of at least three moles of chlorine minus one mole for each equivalent of chlorine in the substrate and less than four moles of chlorine minus one mole for each equivalent of chlorine in the substrate to one mole of substrate.

6. The process as in claim 2 wherein said contacting comprises feeding said chlorine into said interagent containing substrate until said chlorine is in a ratio of at least three moles of chlorine minus one mole for each equivalent of chlorine in the substrate and less than four moles of chlorine minus one mole for each equivalent of chlorine in the substrate to one mole of substrate.

7. The process as in claim 2 wherein said contacting is in the presence of a member selected from the group consisting of heteroaromatic amine, alkyl substituted amide, alkyl substituted urea, tertiary alkyl amine, and salts thereof at a temperature between 0°C. or the temperature at which the reaction mixture is a liquid, whichever is higher, and 60°C.

8. The process as in claim 7 wherein said heteroaromatic amine is collidine and said salt thereof is collidine hydrochloride at a temperaure between 20°C. or the temperature at which the reaction mixture is a liquid, whichever is higher, and 40°C., said chlorine being in a ratio of at least three moles of chlorine minus one mole for each equivalent of chlorine in the substrate and less than four moles of chlorine minus one mole for each equivalent of chlorine in the substrate to one mole of substrate.

9. The process as in claim 8 wherein said contacting is in the presence of said 2,2,6-trichlorocyclohexanone.

10. The process as in claim 2 wherein said contacting is in the presence of an amine member selected from the group consisting of primary aliphatic amines, secondary aliphatic amines, aromatic amines, N-haloamines thereof, and salts thereof at a temperature between 50°C. or the temperature at which the reaction mixture is a liquid, whichever is higher, and 120°C.

11. The process as in claim 10 wherein said primary aliphatic amine is t-butylamine.

12. The process as in claim 10 wherein said amine is a primary aliphatic amine and wherein said aromatic amine is an N-substituted amine at a temperature between 70°C. or the temperature at which the reaction mixture is a liquid, whichever is higher, and 90°C.; said chlorine being in a ratio of at least three moles of chlorine minus one mole for each equivalent of chlorine in the substrate and less than four moles of chlorine minus one mole for each equivalent of chlorine in the substrate to one mole of substrate.

13. The process as in claim 12 wherein said N-substituted amine is diethylaniline and said inert saturated halogenated hydrocarbon is carbon tetrachloride.

* * * * *